United States

Black et al.

[11] 4,009,014

[45] Feb. 22, 1977

[54] OPTICAL FIBER MANUFACTURE

[75] Inventors: Philip William Black, Stansted Mountfitchet; John Irven, Bishop's Stortford, both of England

[73] Assignee: International Standard Electric Corporation, New York, N.Y.

[22] Filed: Sept. 3, 1975

[21] Appl. No.: 610,021

[30] Foreign Application Priority Data

Sept. 5, 1974 United Kingdom ............. 38826/74

[52] U.S. Cl. .............................. 65/3 A; 65/DIG. 7; 350/96 R; 350/96 WG; 427/163

[51] Int. Cl.² ...................... G02B 5/14; C03C 21/00

[58] Field of Search ........ 350/96 R, 96 M, 96 WG; 65/3 R, 3 A, DIG. 7; 427/163, 230

[56] References Cited

UNITED STATES PATENTS

| | | | |
|---|---|---|---|
| 3,659,915 | 5/1972 | Maurer et al. ...................... | 427/163 |
| 3,737,293 | 6/1973 | Maurer ................................ | 65/3 A |

OTHER PUBLICATIONS

Payne et al., "New Silica–Based Low–Loss Optical Fibre", in Electronics Letters, vol. 10(15), pp. 289–290, July 25, 1974.

Payne et al., "Preparation of Water–Free Silica–Based Optical Fibre Waveguide", in Electronics Letters, vol. 10(16), pp. 335–336, Aug. 8, 1974.

Luther–Davies et al., "Evaluation of Material Dispersion in Low Loss Phosphosilicate Core Optical Fibres", in Optics Communications, vol. 13, pp. 84–88, 1975.

Payne et al., "A Borosilicate–Cladded Phosphosilicate Core Optical Fibre", in Optics Communications, vol. 13(4), pp. 422–425, 1975.

*Primary Examiner*—James R. Hoffman
*Attorney, Agent, or Firm*—John T. O'Halloran; Peter C. Van Der Sluys; Richard A. Menelly

[57] ABSTRACT

A fiber optic preform is provided by depositing phosphorus pentoxide as a dopant on the bore of a silica tube to form a high refractive index layer and collapsing the tube to form a core of high index phosphorus pentoxide doped silica.

3 Claims, 4 Drawing Figures

OPTICAL FIBER MANUFACTURE

FIELD OF THE INVENTION

This invention relates to the manufacture of optical fibers and optical fiber preforms.

SUMMARY OF THE INVENTION

According to the present invention there is provided a method of making an optical fiber or optical fiber preform wherein a dopant consisting of or including phosphorus pentoxide is deposited on the bore of a silica tube which diffuses into the tube to form an inner surface layer of higher refractive index and wherein the treated tube is heated and its bore collapsed to form an optical fiber or optical fiber preform having a core of mixed dopant-silica composition.

Preferred materials for co-depositing with phosphorus pentoxide include oxides of germanium, aluminum, titanium, arsenic, gallium, antimony, tantalum, tin, niobioum, indium, and zirconium.

For many applications the presence of -OH groups in or near the core of an optical fiber produces undesirable attenuation and, hence, it is preferred to select a deposition process from which hydrogen and hydroben containing compounds are excluded.

The tube referred to is not necessarily a self-supporting structure but may take the form of a deposited layer lining the bore of another tube. Suitable coating methods include thermally induced vapor reaction, evaporation, r.f. sputtering, and r.f. excited vapor reaction.

There follows a description of the manufacture of an optical fiber to carry radiation in the range 800 – 875 nm.

DESCRIPTION OF THE PREFERRED EMBODIMENT

Figure 1:
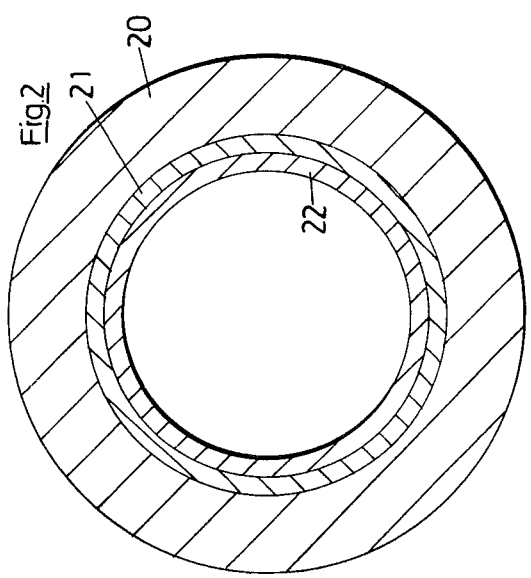
FIG. 1 is a cross-sectional view of one embodiment of a coated tube according to this invention.

FIG. 1 depicts the structures produced by a simple manufacturing process involving the deposition of only one layer 10 upon the bore of a tube 11. The core of the completed fiber is provided in part by the material of the deposited layer 10 while the cladding is provided by the material of the tube 11.

In a single mode optical fiber a significant proportion of the optical signal propagates in the cladding. The transmissivity of the cladding material is therefore an important factor affecting the optical loss of the fiber. Normally, however, for mechanical reasons the thickness of the cladding is made much greater than the depth to which any significant proportion of the optical energy penetrates. Thus, it is only the region of the cladding nearest the core which really needs to have a high transmissivity.

Figure 2:
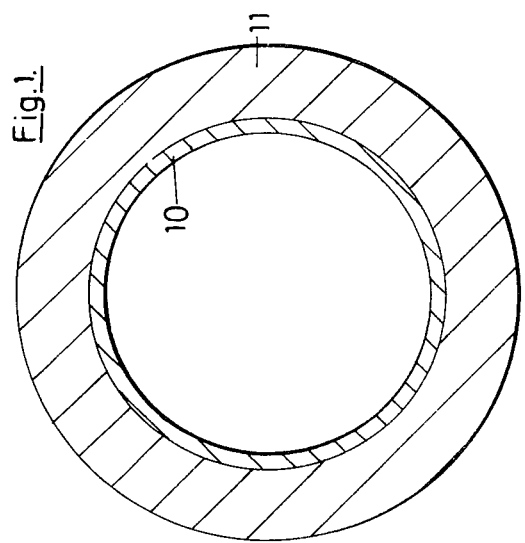
FIG. 2 is a cross-sectional view of an alternate embodiment of the tube of FIG. 1.

Advantage of this factor is taken in the manufacturing process used to produce the structures depicted in FIG. 2. The bore of a silica tube 20 is lined with a layer 21 of silica and then with a dopant layer 22. The core of the completed fiber is provided in part by the material of the second deposited layer 22, while the inner and outer regions of the cladding are provided respectively by the material of the first deposited layer 21 and the material of the tube 20. The silica layer 21 must be of good optical quality, but the tube 20 can safely be made of inferior optical quality material.

Typically a single mode fiber has a core of 3 – 4 $\mu$m diameter whereas the core of a multimode fiber may typically be up to 60 $\mu$m diameter. The diameter of the cladding is typically up to 150 $\mu$m, and the difference refractive index ratio of core to cladding is typically 1.01.

Figure 3:
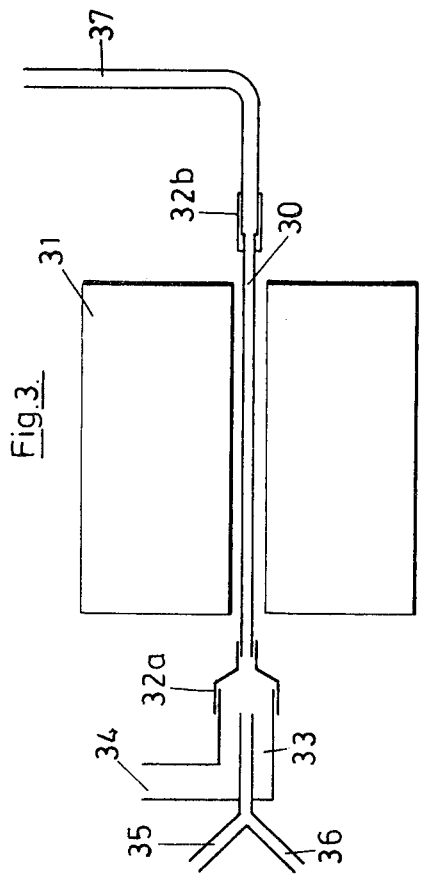
FIG. 3 is a sectional view of the apparatus for coating the bore of the tube of FIG. 1.
Figure 4:
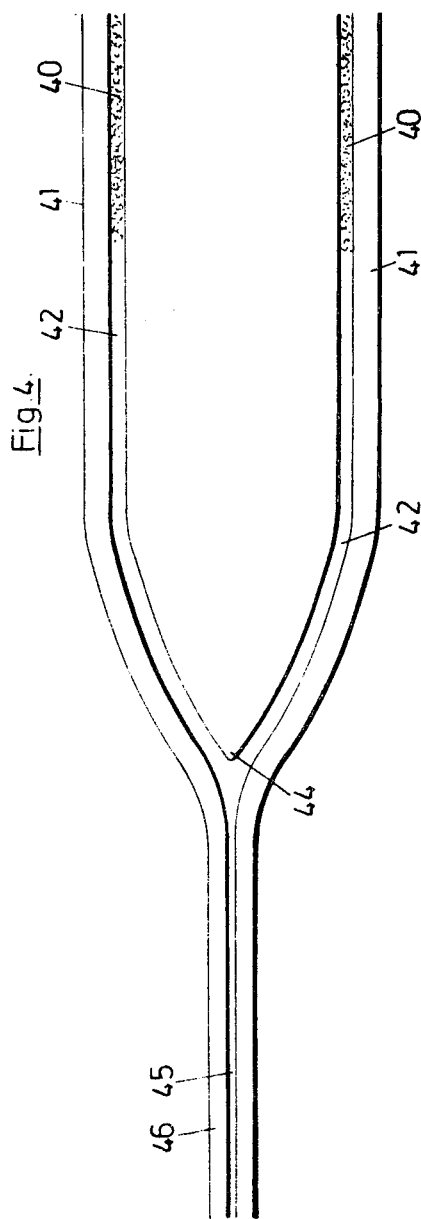
FIG. 4 is a sectional view of the tube of FIG. 1.

A typical manufacture for an optical fiber to carry radiation in the range 800 – 875 nm employs a silica tube 30, FIG. 3, typically 7 mm external diameter with 1 mm wall thickness, and 33 cm long. The bore of the tube is flame polished and then vacuum baked to remove any traces of moisture. An alternative preparation treatment comprises acid etching the bore of the tube, washing it, and then heating it to drive off the residual water. The presence of moisture may produce -OH groups in the completed fiber with their attendant undesirable absorption in the region of 0.95 $\mu$m.

After the tube has been dried it is placed so as to pass through the center of a resistance wound furnace 31, with the tubes ends located in two adaptors 32a and 32b, for example, of polytetrafluoroethylene.

Phosphorus pentoxide is deposited upon the surface of the bore of the tube as the product of a thermally induced chemical vapor reaction. The chemical reactants for this process may be phosphine and oxygen, but since one of the reaction products is water this is liable to produce unwanted -OH groups in the final product. This problem is avoided by using any non-hydrogen containing compounds such as a halide or oxyhalide, e.g. phosphorus trichloride or phosphorus oxychloride in place of the hydride. Phosphine can be introduced into the reaction zone as a gas, but phosphorus trichloride and phosphorus oxychloride are liquids at room temperature and, hence, need to be entrained in a carrier gas.

The adapter 32a is coupled to an inlet tube 33 having a first inlet port 34 for oxygen, a second inlet port 35 for phosphorus trichloride or, for example, phosphorus oxychloride entrained in a carrier gas, and a third inlet port 36 for the introduction of other vapors for the provision of optional other dopant constituents. The adapter 32b is coupled to an exhaust tube 37.

The reaction does not proceed spontaneously at room temperature, but is promoted in the localized hot zone inside the furnace. A uniform coating along the length of the bore of the tube is provided by careful control of reaction parameters such as flow rates, temperatures and vapor pressures, etc. For longer lengths a moving hot zone is to be preferred, the deposition following the hot zone as it proceeds along the tube.

The phosphorus pentoxide may be deposited as a powdery layer or as a glassy layer according to the temperature and flow conditions of deposition. Both forms are suitable for the manufacture of optical fiber.

A typical deposition process uses oxygen as a carrier gas in which to entrain phosphorus trichloride. Oxygen is bubbled at the rate of about 200 cc per minute through phosphorus trichloride. This may be at room temperature or it may be maintained at a constant temperature typically about −40° C. The vapor and gas mixture is passed through the tube 30 while the furnace is maintained at a temperature of about 1,000° to 1,200° C. The rate of deposition is controlled by bleeding in additional oxygen. Typically thee deposition rate is controlled to provide a layer a few microns thick over a period of about an hour. This deposition process may be modified by the substitution of phosphorus oxychloride in place of the trichloride.

The coated tube is removed from the deposition apparatus and mounted in apparatus for collapsing its bore. In this apparatus it is supported at both ends and rotated about its axis while a high temperature heat source such as an oxyhydrogen flame is passed slowly along its length. As the flame approaches each part of the tube the temperature of the inner wall first rises sufficiently to cause the deposited phosphorus pentoxide layer 40 to react with the silica of the tube 41 to form a transparent glassy layer 42 of mixed composition. This occurs typically at about 1,400° C. Then as the flame gets nearer the temperature rises still further to about 1,700° C at which the tube becomes so soft that its bore collapses as indicated at 44. At this stage the layer 42 has become the core 45 of an optical fiber preform 46.

After the collapsed tube optical fiber preform is removed from the collapsing apparatus it is mounted in conventional fiber pulling apparatus for drawing down into optical fiber. This requires a short hot zone capable of producing a temperature of about 1,700° to 1,800° C at which drawing can take place.

If the quality of the initial silica tube is such that it does not have sufficiently low loss the deposition apparatus can be used to deposit a layer prior to the deposition of the phosphorus pentoxide. If the silica is deposited as a powdery layer it is heated to turn it into a glassy layer before the phosphorus pentoxide is deposited. One way of depositing the silica involves reacting silicon tetrachloride or tetra-iodide with oxygen.

The silica layer is not necessarily a layer of pure silica but may be a doped layer made by co-depositing the silica with one or more dopant oxides. One advantage of employing a doped silica layer is that the presence of a suitable dopant is effective in reducing the deposition reaction temperature. Another advantage is that the presence of a dopant tends to lower the temperature at which the deposit is formed as a glassy layer rather than a particulate one. The use of boric oxide as a dopant is distinguished from the other dopants in that it reduces the refractive index rather than increasing it and thus its use is potentially helpful is produce a fiber of large numerical aperture.

The concentration profile of the dopant, phosphorus pentoxide in the optical fiber preform depends to a large extent upon the temperature cycling that has taken place during its manufacture. One effect of high temperature is to allow the dopant to diffuse into the glass of the tube, but another effect, which is liable to occur before collapse of the bore, is the depletion of the dopant from the innr surface by evaporation. With appropriate control of the heating cycle a deliberately graded refractive index profile may be obtained to provide an optical fiber preform suitable for drawing down into a self-focusing type of optical fiber.

If the deposited layer consists solely of phosphorus pentoxide the use of a sharply localized heating source for collapsing the bore is liable to produce so much evaporation of the dopant that the loss of dopant produces a dip in refractive index at the center of the core that is undesirable for many application. If, however, the tube is given a first heat treatment before collapse the dip in refractive index can be considerably reduced or virtually eliminated. The first heat treatment consists of taking the tube up to a temperature of about 1,400° C as opposed to the temperature of about 1,700° C required for collapse. Typically each part of the tube is taken to the lower temperature for a period ranging from a few seconds to a few minutes. This heat treatment also has the effect of producing a graded profile by decreasing the steepness of the transition in refractive index across the boundary between the core and cladding regions of the preform and thus contributes to a lessening of the mode dispersion.

In the control of the refractive index grading between the core and cladding regions use may be made of more than one dopant so as to take advantage of different properties. For instance phosphorus pentoxide can be co-deposited with alumina. In a subsequent heat treatment to promote diffusion of the phosphorus pentoxide, the alumina, reduces or eliminates the dip in refractive index at the center of the core which might occur in the absence of the alumina. If desired, the alumina can be deposited after the deposition of the phosphorus pentoxide instead of simultaneously with it.

A further variation of the first described method involves heating the furnace to a higher temperature, typically about 1,400° C, during the deposition reaction so that the phosphorus pentoxide is able to start diffusing into the silica as it is formed. With this method a relatively thick layer of mixed dopant-silica composition can readily be made suitable for making a multimode optical fiber preform, and there is the further advantage that the reaction rate is speeded up.

Although previous reference has been made to the use of an oxyhydrogen flame as a heat source, this is not the preferred heat source because it is believed that it may be a source of contamination of the final fiber with -OH groups. For this reason it is preferred to substitute hydrogen-free heat sources, such as a resistive tube furnace or an r.f. heated susceptor, for all heating stages of manufacture including the final stage of drawing the preform into optical fiber.

It is to be understood that the foregoing description of specific examples of this invention is made by way of example only and is not to be considered as a limitation on its scope.

What is claimed is:

1. A method for forming an optical fiber preform for producing low mode dispersion optical fibers comprising the steps of:

depositing phosphorus pentoxide on the inner surface of a silica tube to provide a region of high index of refraction on said inner surface;

heating the phosphorus pentoxide coated tube up to a first temperature of 1400° C to diffuse the phosphorus pentoxide into the silica; and subsequently heating the tube to a second temperature of 1700° C to collapse the tube and form the preform.

2. A method for forming an optical fiber preform for producing a low dispersion multimode optical fiber comprising the steps of:

heating a silica tube having a first index of refraction to a first temperature of 1400° C;

depositing phosphorus pentoxide upon the inner surface of the tube while maintaining the tube at said first temperature to diffuse the phosphorus pentoxide into the silica during deposition for increasing the index of refraction of the inner surface of the tube; and heating the silica tube to a second temperature of 1700° C to collapse the tube and form the preform.

3. The method of claim 1 wherein the tube is heated to the first temperature for a period of time ranging from a few seconds to a few minutes.

* * * * *